May 9, 1944. H. L. HOLLIS 2,348,256
REMOVABLE TIRE COVER
Filed Feb. 21, 1942 2 Sheets-Sheet 2

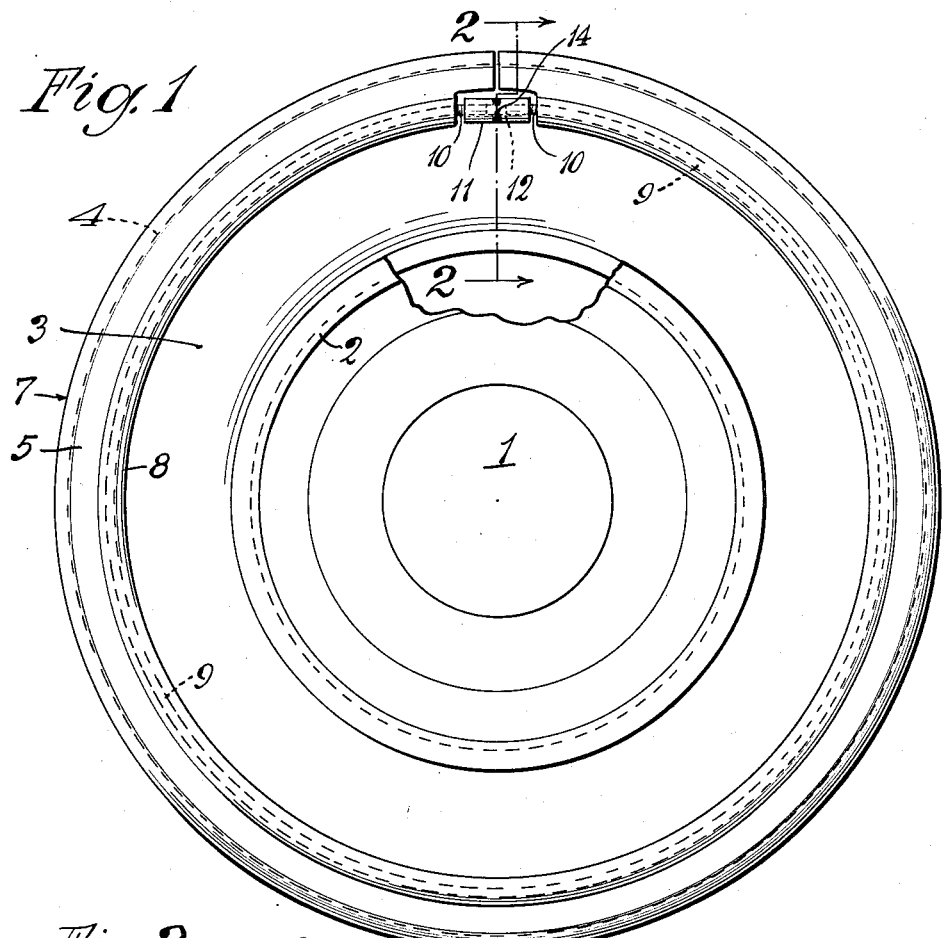
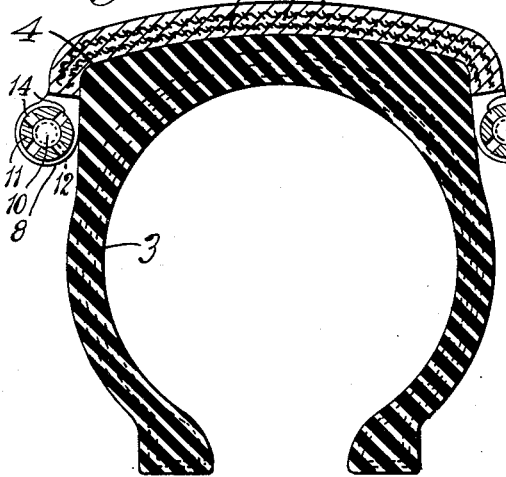
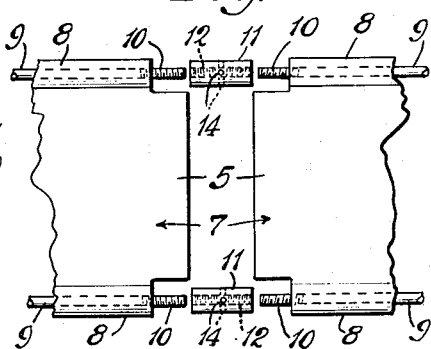
Inventor
Henry L. Hollis
by Parker Carter
Attorneys.

Inventor
Henry L. Hollis
by Parker Harter
Attorneys

Patented May 9, 1944

2,348,256

UNITED STATES PATENT OFFICE 2,348,256

REMOVABLE TIRE COVER

Henry L. Hollis, Chicago, Ill.

Application February 21, 1942, Serial No. 431,813

1 Claim. (Cl. 152—185)

My invention relates to articles having a flexible fabric body coated or impregnated with a flexible material.

One application of my invention is the provision of an improved outer layer for automobile tires and the like.

A specific application of my invention is to removable tire covers or outer layers, which may for example be applied to the surface of more or less worn automobile tires.

Another purpose is the provision of such a the cover or element which may be formed from an impregnated or covered fabric strip, and which may be cut to size and applied to an automobile tire.

An application of my invention is the employment of an outer covering for worn automobile tires, which may if desired employ a material other than rubber.

A further application is to the manufacture of automobile tires.

Other purposes will appear from time to time in the course of the specification and claim.

I illustrate my invention more or less diagrammatically in the accompanying drawings wherein:

Fig. 1 illustrates an automobile tire with a covering applied thereto;

Fig. 2 is a section on the line 2—2 of Fig. 1, on an enlarged scale;

Fig. 3 illustrates a mode of joining the ends of a tire covering strip;

Like parts are indicated by like symbols throughout the specification and drawings.

Figure 4:
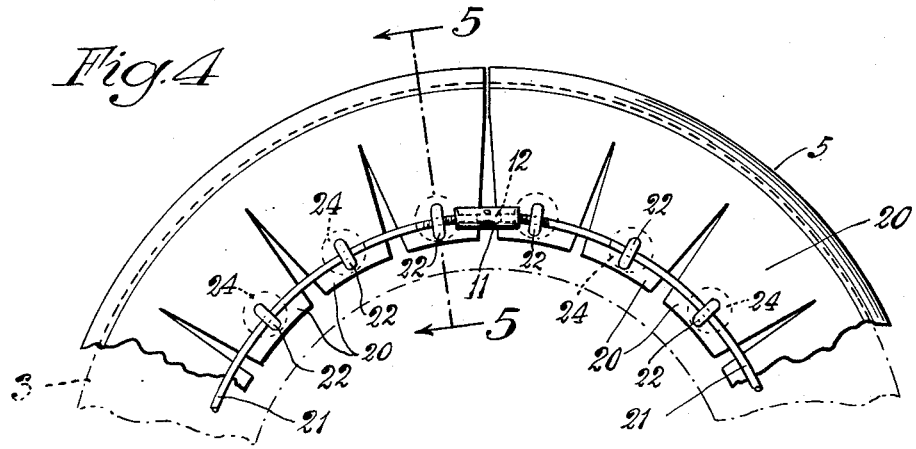
Fig. 4 is a partial side elevation of a variant form of the device.

Referring to the drawings, 1 generally indicates the central part of an automobile wheel, the details of which form no part of the present invention. 2 indicates the rim. 3 is a side of the automobile tire. 4 illustrates the more or less square tread portion of the tire. 5 illustrates a fabric body or strip which may be formed of one or more layers of fabric and which includes the mass 6 of a flexible material in which the fabric is imbedded and which includes an outer surface layer 7 adapted to engage the road surface. The edges of the fabric strip thus formed may be lapped over as at 8 and conform with any suitable aperture, through which may be threaded flexible members or wires 9, the ends of which may be screw threaded, as at 10, to receive any suitable turnbuckle member 11, having a screw threaded inner aperture 12. It will be understood that the threads of the opposed wire ends 10 are at opposite pitch, so that a rotation of the turnbuckle 11 in one direction draws the wire ends together, and a rotation in the opposite direction releases them.

Any suitable means may be employed for actuating the turnbuckle. I may for example provide it with a plurality of apertures 14, into which any suitable rotating tool may be inserted.

It will be realized that, whereas I have described and shown a wire and turnbuckle including a turnbuckle of a particular type, I may employ any suitable means for drawing the opposite edges of the fabric strip downwardly about the tire. In Fig. 2 I have illustrated a relatively narrow strip, with the strip edges and the wires extending only a short distance radially inwardly toward the axis. It will be understood, however, this showing is illustrative rather than restrictive.

I may employ any suitable fabric, and any suitable imbedding and coating and impregnating material, including rubber if desired. However, my application is well adapted to the employment of materials other than rubber and is, therefore, of particular practical importance in view of the now prevailing rubber shortage.

As an example of a non-rubber substance, I may employ a plastic. As an example of such a plastic which I find practical, I may employ the chemical reaction product of resorcinol paranitroaniline and formaldehyde, a plastic described in Patent No. 2,029,012, issued on January 28, 1936, to Hal T. Beans, George H. Walden, Jr., and Louis P. Hammett.

I may employ any suitable fabric, such for example as the fabrics customarily used in forming automobile tires. Or I may employ fabrics formed of yarns made from cellulose acetate or from any suitable plastic. I may for example employ yarns made from vinyl chloride derivatives. It may be advantageous, when employing a plastic for the coating of the member, to employ if possible a plastic fabric having substantially the same coefficient of expansion.

In forming the strip, I first form the fabric body, which may advantageously be flat if the narrow strip type of the full line showing of Fig. 2 is used, or which may be pre-formed if the dotted line showing of Fig. 2 is employed. The fabric is then surrounded by the coating material, and the body thus formed subjected to a heated die or mold under pressure, or otherwise treated under heat and pressure.

In employing the above mentioned chemical reaction product of resorcinol paranitroaniline and formaldehyde, a plasticizer is added, such as Turkey red oil.

Figure 5:
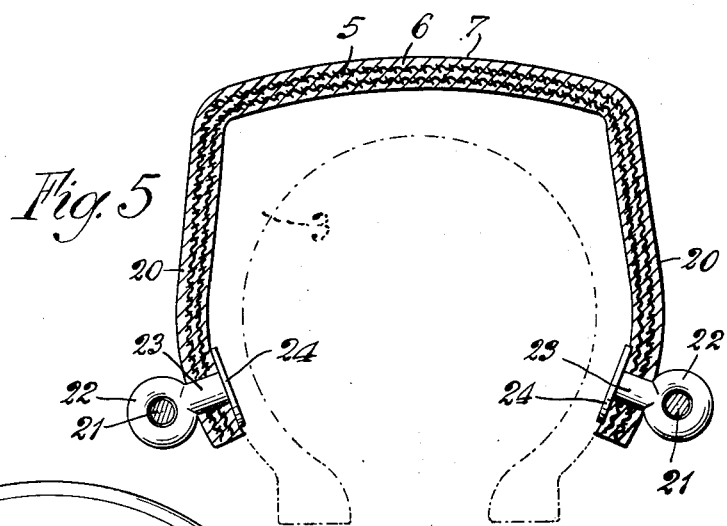
Fig. 5 is a section on the line 5—5 of Fig. 4.

In employing a tire cover which is lapped inwardly radially a substantial distance from the tread of the tire, it may be advisable, as shown in Fig. 4, to employ a plurality of tapered tongues 20, through or about which a wire 21 or any suitable securing means may be passed. In Figs. 4 and 5 I illustrate a variant form of securing the wire in relation to the tongues 20, the wire 21 passing through eyes 22, which may be on stems 23 headed at their opposite ends, as at 24. Similar eyes may be employed with the tongues 20, as shown in Fig. 4.

It will be realized that, whereas I have described and shown a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

Figure 6:
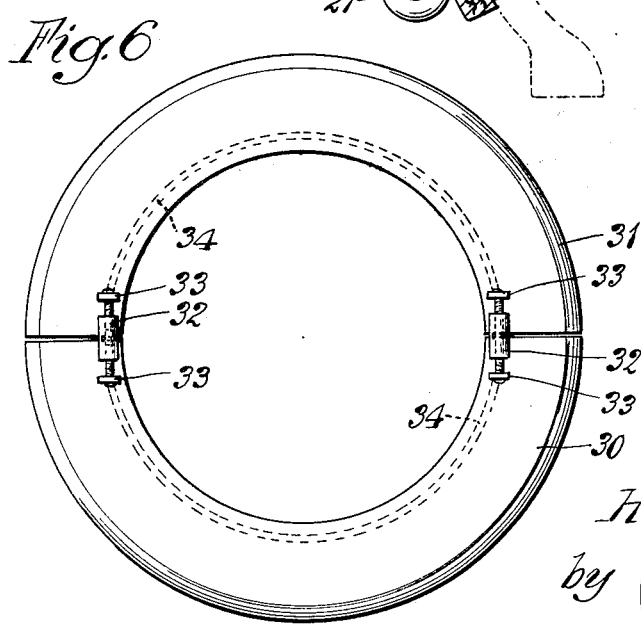
Fig. 6 is a side elevation of a still further variant form.

For example, instead of the flexible strip shown in the other views, I may employ a definitely pre-formed unit, as in Fig. 6, which may include two or more segmental formed sections 30, 31, connected at their edges by any suitable means, for example turnbuckles or other suitable securing means 32, passing through lugs 33. It may be advisable to have a wire or reinforcement 34 connected to the lugs 32 and extending throughout the entire length of the individual sections 30 and 31.

I claim:

A tire cover having a fabric body and a flexible body surrounding and coating said fabric, and including a product resulting from the chemical reaction of resorcinol paranitroaniline and formaldehyde.

HENRY L. HOLLIS.